United States Patent [19]

Wallace

[11] Patent Number: 5,023,594
[45] Date of Patent: Jun. 11, 1991

[54] CEILING MOUNT MICROWAVE TRANSCEIVER WITH 360 DEGREE RADIATION PATTERN

[75] Inventor: John D. Wallace, San Jose, Calif.
[73] Assignee: C & K Systems, Inc., San Jose, Calif.
[21] Appl. No.: 487,413
[22] Filed: Mar. 1, 1990
[51] Int. Cl.⁵ ............................................. G08B 13/18
[52] U.S. Cl. ...................................... 340/552; 333/26; 343/772
[58] Field of Search ...................... 340/552, 553, 554; 343/772; 333/26, 227

[56] References Cited

U.S. PATENT DOCUMENTS

| | | | |
|---|---|---|---|
| 3,509,572 | 4/1970 | Barbano | 343/792.5 |
| 4,090,195 | 5/1978 | Guennou et al. | 340/554 |
| 4,139,828 | 2/1979 | Commault et al. | 333/26 |
| 4,791,420 | 12/1988 | Baba | 340/554 |
| 4,837,524 | 6/1989 | Nakamura | 333/26 |

OTHER PUBLICATIONS

"Pattern Prediction of Broadband Monopole Antennas on Finite Groundplanes Using the BOR Moment Method", authored by Dirk E. Baker and Louis Botha, published in Microwave Journal (Sep. 1988, pp. 153, 154, 156, 158, 160, 162, 164).

Primary Examiner—Glen R. Swann, III
Attorney, Agent, or Firm—Limbach, Limbach & Sutton

[57] ABSTRACT

A microwave transceiver comprising a Gunn diode microwave radiation source, a Schottky-barrier diode mixer, a closed rectangular waveguide cavity, a coaxial-waveguide joint, and a monopole antenna providing a microwave radiation dispersion/collection pattern occupying a spatial region elevated from and extending radially outward and 360° in azimuth with respect to said antenna, said spatial region having a substantially spatulate radial cross-section.

14 Claims, 2 Drawing Sheets

CEILING MOUNT MICROWAVE TRANSCEIVER WITH 360 DEGREE RADIATION PATTERN

BACKGROUND OF THE INVENTION

1. Field of the Invention

The present invention relates to motion detectors, and more particularly, to a microwave transceiver capable of detecting motion within a spatial region extending substantially radially outward and 360° in azimuth with respect thereto.

2. Description of the Related Art

Area protection sensors and/or intrusion detection systems, such as those used in burglar alarms, typically include presence and/or motion detectors. Two general types of detectors are used: passive and active. An example of a passive detector is a passive infrared detector which detects the presence and/or motion of infrared radiation within a defined area to be protected.

An example of an active detector is a transceiver. The transceiver transmits and receives some form of radiation to detect the presence and/or motion of an object within the defined area to be protected. One example is an acoustic transceiver which transmits and receives acoustic radiation (e.g., ultrasonic, SONAR) to perform its detection function. Another example is a microwave transceiver which transmits and receives microwave radiation (typically frequencies greater than 1 Gigahertz) to perform its detection function.

In a microwave transceiver, the microwave radiation is typically coupled into free space and transmitted by way of a waveguide horn antenna. (See FIG. 1.) Such an antenna effectively radiates and collects the microwave radiation, however, its radiation dispersion and collection characteristics are not omni-directional. In fact, such an antenna exhibits a high degree of directivity, i.e., the edges of its radiation dispersion/collection characteristics extend outwardly at an acute mutual angle. Thus, such a waveguide antenna is limited to less than 180° of coverage in the azimuth.

Although other types of antennas may be used to obtain an omni-directional radiation dispersion/collection pattern, typically they require additional external parts making them larger, more expensive and difficult to align/tune. For example, a reflector type of antenna may be used. But, such an antenna is typically significantly larger and does not provide uniform field strength within the radiated wave. As another example, a multiple element, or array, type of antenna may be used. However, such an antenna is significantly larger with tighter fabrication tolerances and requires a complex signal feeder.

SUMMARY OF THE INVENTION

The present invention comprises a microwave transceiver and antenna for detecting an intrusion into a defined spatial region. The microwave transceiver of the present invention comprises a microwave radiation generator, a microwave radiation receiver and a housing assembly therefor.

The microwave transceiver housing provides a rectangular waveguide, a shunt to ground reference for the second harmonic (of the transmitted radiation), a ground reference plane for the antenna and a coaxial-waveguide joint for coupling the transmitted and received microwave radiation between the rectangular waveguide and antenna.

The antenna radiates the transmitted microwave radiation and collects the received microwave radiation. The antenna is a monopole which provides for transmission and reception of microwave radiation within a spatial region extending substantially radially outward and 360° in azimuth with respect to the major axis of the antenna, with the spatial region having a substantially spatulate radial cross-section.

DETAILED DESCRIPTION OF THE INVENTION

Figure 1:
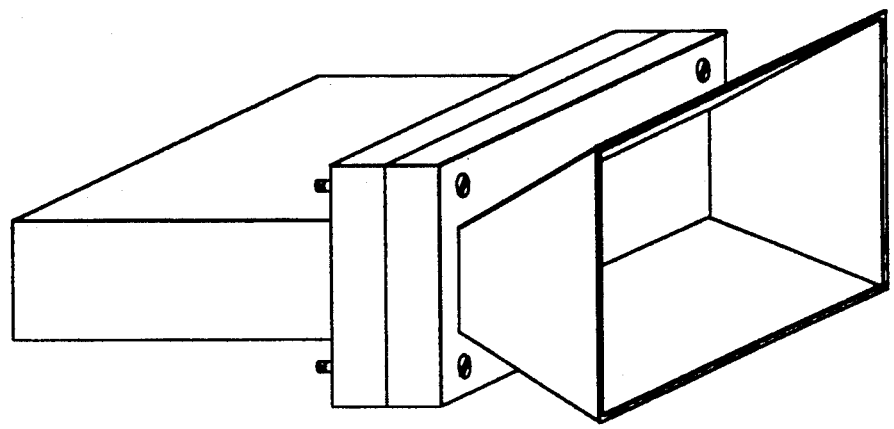
FIG. 1 is a perspective view of a prior art microwave transceiver and antenna.
Figure 2:
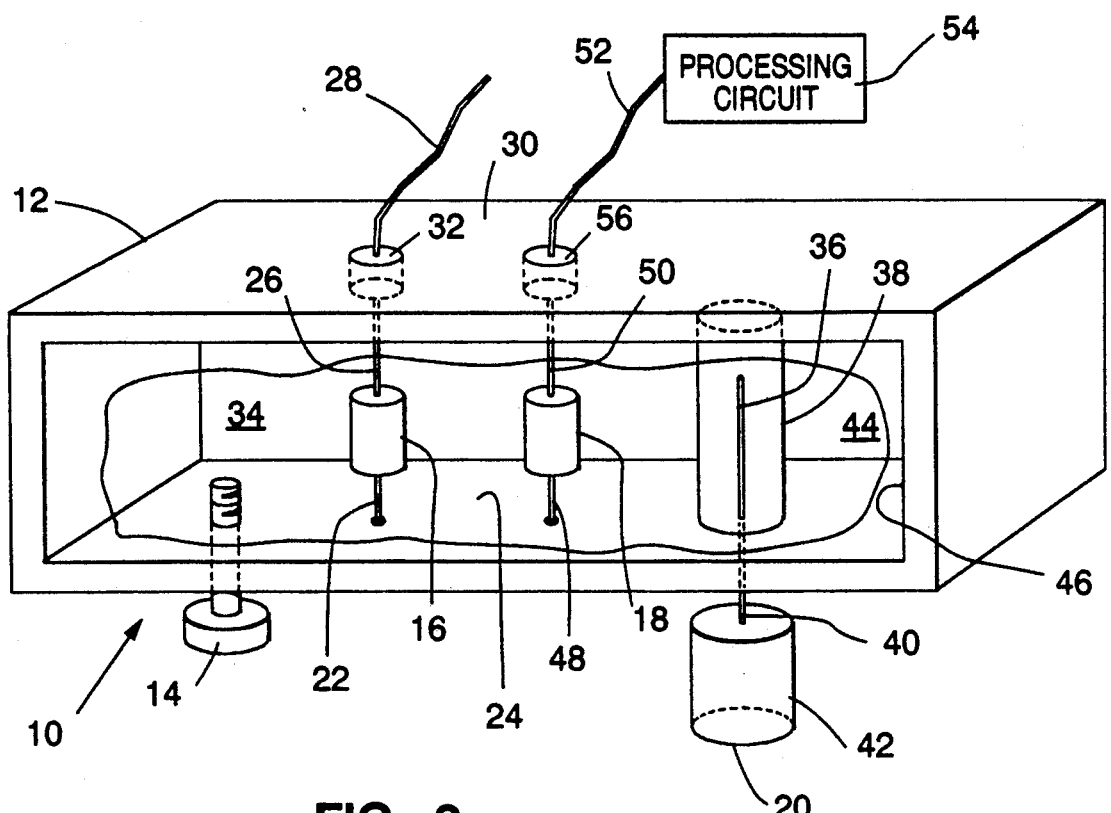
FIG. 2 is a cut-away perspective view of a preferred embodiment of the microwave transceiver and antenna of the present invention.

FIG. 2 illustrates a preferred embodiment 10 of the present invention. This cut-away perspective view shows the typical primary components used in the present invention. These components include a section of closed rectangular waveguide 12, a microwave tuning screw 14, a Gunn diode 16, a Schottky-barrier diode 18 and an antenna assembly 20. The waveguide 12, tuning screw 14 and diodes 16,18 are quite common in the microwave field and are well known in the art. The antenna assembly 20 is described in more detail below.

One lead 22 of the Gunn diode 16 is electrically terminated by the lower wall 24 (e.g., via conductive clamp) of the waveguide 12. The other lead 26 is connected to an external source of DC power (not shown) by way of an external wire 28. This lead 26 reaches the wire 28 by passing through the top wall 30 of the waveguide 12 via a dielectric feed-through 32. With DC power applied, the Gunn diode 16 becomes a microwave oscillator forming a microwave signal source, well known in the art.

The frequency of oscillation of the microwave radiation emanating from the Gunn diode 16 is determined by the size and dimensions of the cavity 34 lying between the Gunn diode 16 and the closest internal walls of the waveguide 12. The dimensions and size of this cavity 34 are preselected according to methods well known in the art so as to cause the Gunn diode 16 to provide the correct signal frequency. To allow for manufacturing tolerance effects, a tuning screw 14 is included so as to fine tune the dimensions of the cavity 34, thereby fine tuning the frequency of oscillation of the microwave radiation emanating from the Gunn diode 16. During signal transmission, this microwave radiation propagates within the waveguide 12 in the direction of the antenna assembly 20.

The antenna assembly 20 includes a conductive pickup 36, an insulating support 38, a matching section 40 and an electromagnetic radiator 42. The pickup 36 and insulating support 38, in conjunction with the waveguide 12, comprise a coaxial-waveguide joint. This joint provides the interface between the two propagation media for the microwave radiation, namely the waveguide 12 and the coaxial transmission line formed by the pickup 36 and insulating support 38. As described below, this joint provides for the coupling of microwave radiation into and out of the waveguide 12.

The cavity 44 comprising the region bounded by the conductive pickup 36 and the closest internal walls of the waveguide 12 acts as a second harmonic filter. The linear distance between the pickup 36 and the nearest end vertical waveguide wall 46 is made substantially equal to one fourth of the wavelength of the desired transmission signal frequency. Since this wall 46 is electrically conductive and electrically connected directly to the other walls of the waveguide 12, it serves as a quarter-wavelength shorted stub. Thus, at the fundamental transmission signal frequency this wall appears to be an open termination, while at the second harmonic of the desired frequency, it serves as a shorted termination, thereby substantially shunting the undesired second harmonic of the transmission signal directly to ground reference.

The length of the conductive pickup 36, i.e., the depth of its protrusion into the waveguide 12, is set so as to cause the coaxial-waveguide joint (described above) to provide an interface having a low voltage-standing-wave-ratio (VSWR), thereby providing for maximum signal power transfer. The requisite length for the pickup 36 may be determined theoretically by means well known in the art or empirically by other means well known in the art (e.g., VSWR measurement, signal power measurement).

The transmitted signal exits the waveguide 12 by way of the coaxial medium formed by the pickup 36 and insulating support 38 which extend through the lower wall 24 of the waveguide 12. From there the signal goes to the radiator 42 by way of a matching section 40. The matching section 40 substantially matches the coaxial impedance (50 ohms nominal) to the radiator impedance (approximately 30 ohms). The matching section 40 is merely an electrical extension of the conductive pickup 36 without the surrounding insulated support 38. The length of conductor forming the matching section 40 introduces inductance in series with the coaxial and radiator impedances, thereby providing a substantial impedance match therebetween. Thus, substantially all signal power is effectively coupled to the radiator 42 for transmission (i.e., radiation).

The radiator 42 is a cylindrical conductor, which may be hollow or solid. The cylindrical length of the radiator 42 is made substantially equal to one quarter ("¼") of the wavelength of the desired transmission frequency. The cylindrical diameter of the radiator 42, as compared to the cylindrical length, determines the bandwidth of the radiator 42. In a preferred embodiment of the present invention, the diameter is selected to be equal to approximately one-seventh ("1/7") of the cylindrical length of the radiator 42. This provides sufficient radiator 42 bandwidth to allow operation over the permitted frequency range. It will be readily appreciated by one skilled in the art, however, that other lengthdiameter ratios may be selected to achieve different bandwidths.

During signal reception, the path for the incoming signal is simply reversed from that of the transmitted signal. The radiator 42 serves as a receiving antenna, collecting microwave radiation and sending it via the matching section 40 to the conductive pickup 36 which now serves to couple the received radiation into the waveguide 12.

This received radiation propagates within the waveguide 12 to the Schottky-barrier diode 18, wherein it is non-linearally mixed with the reference signal generated by the Gunn diode 16 (discussed above). This mixing produces a low intermediate frequency (IF) signal. One lead 48 of the Schottky diode 18 is terminated electrically by the lower wall 24 (e.g., via conductive clamp) of the waveguide 12. The other lead 50 is connected electrically to an external wire 52 which leads to external processing circuitry 54. The lead 50 reaches the wire 52 by way of an insulated feed-through 56 in the top wall 30 of the waveguide 12. The IF signal produced within the Schottky-barrier diode 18 (discussed above) is processed by the external processing circuitry 54, getting there by way of the lead 50 and wire 52. In a preferred embodiment of the present invention, the frequency of this IF signal will typically range between one-half and 100 Hertz.

The processing circuitry 54 may be intrusion detection circuitry which is well known in the art. Such circuitry analyzes the IF signal and detects whether an intrusion (e.g., presence or motion of an object) has occurred within the spatial region irradiated by the transmitted radiation.

The linear distance separating the diodes 16,18 within the waveguide 12 is dependent upon the electrical characteristics of the diodes 16,18. Typically, this distance will be determined empirically by varying this distance until the power coupling of the signal produced by the Gunn diode 16 into the Schottky-barrier diode 18 is maximized. This substantially reconciles the dissimilar electrical characteristics of the diodes 16,18, thereby making them compatible. Once this distance has been empirically determined, it need not be adjusted, provided the electrical characteristics of the diodes 16,18 do not vary significantly. In a preferred embodiment of the present invention, this distance will typically be in the range of one-fourth to one-third of the wavelength of the desired signal.

Figure 3A:
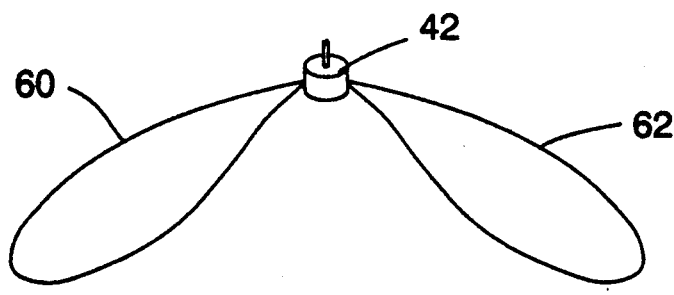
FIG. 3A is a planar, cross-sectional side view of the energy radiation/reception pattern of the antenna of the present invention.

FIG. 3A illustrates a planar cross-sectional view of the radiation dispersion/collection pattern of the radiator 42 of the present invention. The cross-sectional regions 60,62 of radiation dispersion (or radiation collection if the radiator 42 is used as a receiving antenna) are illustrated as being spatulately shaped (i.e., similar to a spatula or spoon) and oriented in a downward direction as if the radiator 42 were disposed relative to the waveguide 12 as shown in FIG. 2. This orientation results when the bottom surface of the waveguide 12 from which the matching section 40 and radiator 42 extend (or some other equivalent surface) serves as the grounded reference plane for the radiator 42. This type of antenna-ground reference plane configuration is well known in the art as a monopole antenna over a ground plane.

Figure 3B:
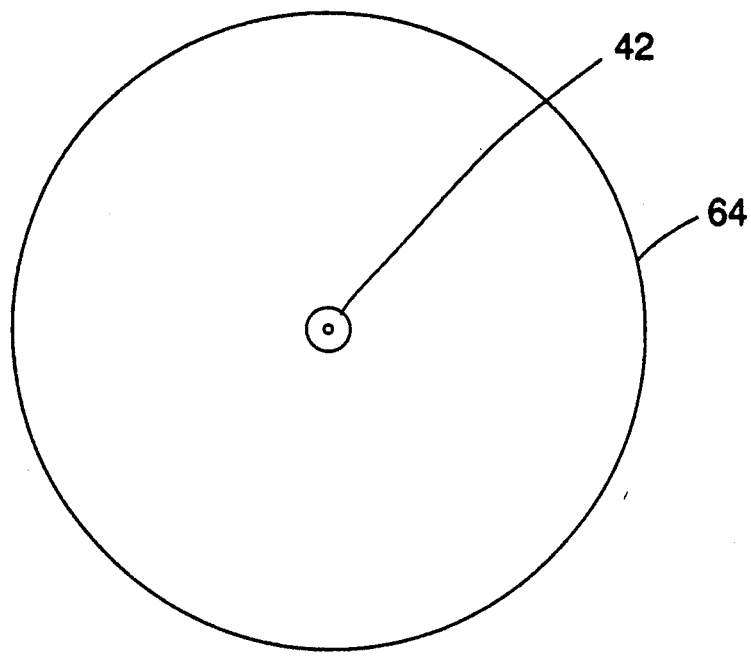
FIG. 3B is a planar, cross-sectional top view of the energy radiation/reception pattern of the antenna of the present invention.

FIG. 3B illustrates the same radiation dispersion/collection pattern about the radiator 42 when viewed from above the radiator 42 looking downward. This cross-sectional region 64 is substantially circular, representing the 360° azimuthal characteristic of the pattern.

Figure 3C:
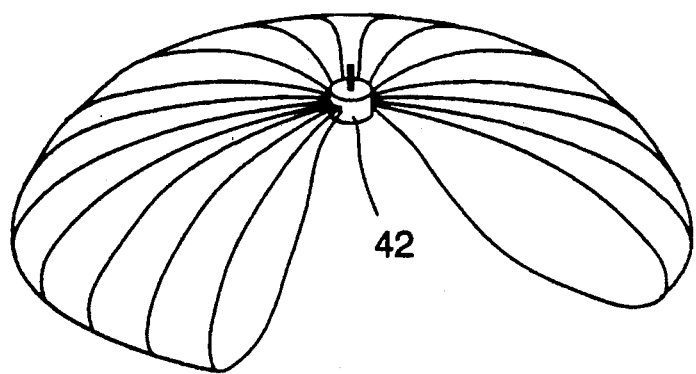
FIG. 3C is a cut-away perspective view of the energy radiation/reception pattern of the antenna of the present invention.

FIG. 3C also illustrates the same radiation dispersion/collection pattern when viewed in a cut-away perspective manner.

What is claimed:

1. An improvement in an apparatus for the transmission and reception of electromagnetic radiation, said apparatus having generator means for generating transmitted electromagnetic radiation for transmission at a transmission frequency, cavity means for propagating said transmitted radiation in a waveguide mode, and reception means for receiving and converting received electromagnetic radiation into a received electrical signal, wherein said improvement comprises:

antenna means for radiating said transmitted radiation and collecting said received radiation within a spatial region elevated from and extending substantially radially outward and 360° in azimuth with respect to said antenna means, said spatial region having a substantially spatulate radial cross-section;

pickup means electrically connected to said antenna means and positioned within said cavity means for receiving and converting said propagated transmitted radiation from said waveguide mode to a coaxial mode and for converting said collected received radiation from a coaxial propagation mode to a waveguide propagation mode; and filter means for substantially shunting to ground reference said propagated transmitted radiation comprising substantially the second harmonic of said transmission frequency.

2. An active intrusion detection system, comprising:

generator means for generating electromagnetic radiation for transmission at a transmission frequency;

receiver means for receiving electromagnetic radiation;

housing means for containing said generator and convertor means; and antenna means for radiating said transmitted electromagnetic radiation and collecting said received electromagnetic radiation within a spatial region elevated from and extending substantially radially outward and 360° in azimuth with respect to said antenna means, said spatial region having a substantially spatulate radial cross-section.

3. An apparatus as defined in claim 2, further comprising processing means for processing said received electromagnetic radiation into an electrical signal indicative of a detection of an intrusion.

4. An apparatus as defined in claim 3, wherein said transmitted and received electromagnetic radiation lies substantially within the microwave frequency range of the electromagnetic spectrum.

5. An apparatus as defined in claim 3, wherein said generator means comprises a Gunn diode.

6. An apparatus as defined in claim 3, wherein said receiver means comprises a Schottky-barrier diode.

7. An apparatus as defined in claim 3, wherein said housing means comprises a closed rectangular waveguide having inner and outer walls.

8. An apparatus as defined in claim 7, wherein said rectangular waveguide comprises a tuning cavity for tuning said transmission frequency, a matching cavity for substantially reconciling the respective electrical characteristics of said generator and receiver means, and a filter cavity for substantially shunting to ground reference said transmitted radiation comprising the second harmonic of said transmission frequency.

9. An apparatus as defined in claim 3, wherein said antenna means comprises a monopole antenna.

10. An apparatus as defined in claim 7, wherein said antenna means comprises a monopole antenna electrically coupled to said rectangular waveguide by way of a coaxial-waveguide joint, said antenna extending outwardly from and substantially normal to an outer wall of said waveguide, and the outer surface of said outer wall comprising a ground plane reference for said antenna.

11. An apparatus for sensing a physical intrusion into a defined spatial region, comprising:

a microwave transceiver and a microwave antenna having an electromagnetic radiation pattern elevated from and extending substantially radially outward and 360° in azimuth with respect to said antenna, said pattern having a substantially spatulate radial cross-section.

12. An apparatus as defined in claim 11, wherein said microwave transceiver comprises a Gunn diode and a Schottky-barrier diode.

13. An apparatus as defined in claim 11, wherein said microwave antenna comprises a monopole antenna.

14. An apparatus as defined in claim 13, wherein said microwave transceiver comprises a microwave generator, a microwave receiver, a closed rectangular waveguide, a coaxial-waveguide joint, and an antenna ground plane reference.

* * * * *